MAGNETIC TAPE SUPPORT
Original Filed Oct. 30, 1964 14 Sheets-Sheet 1
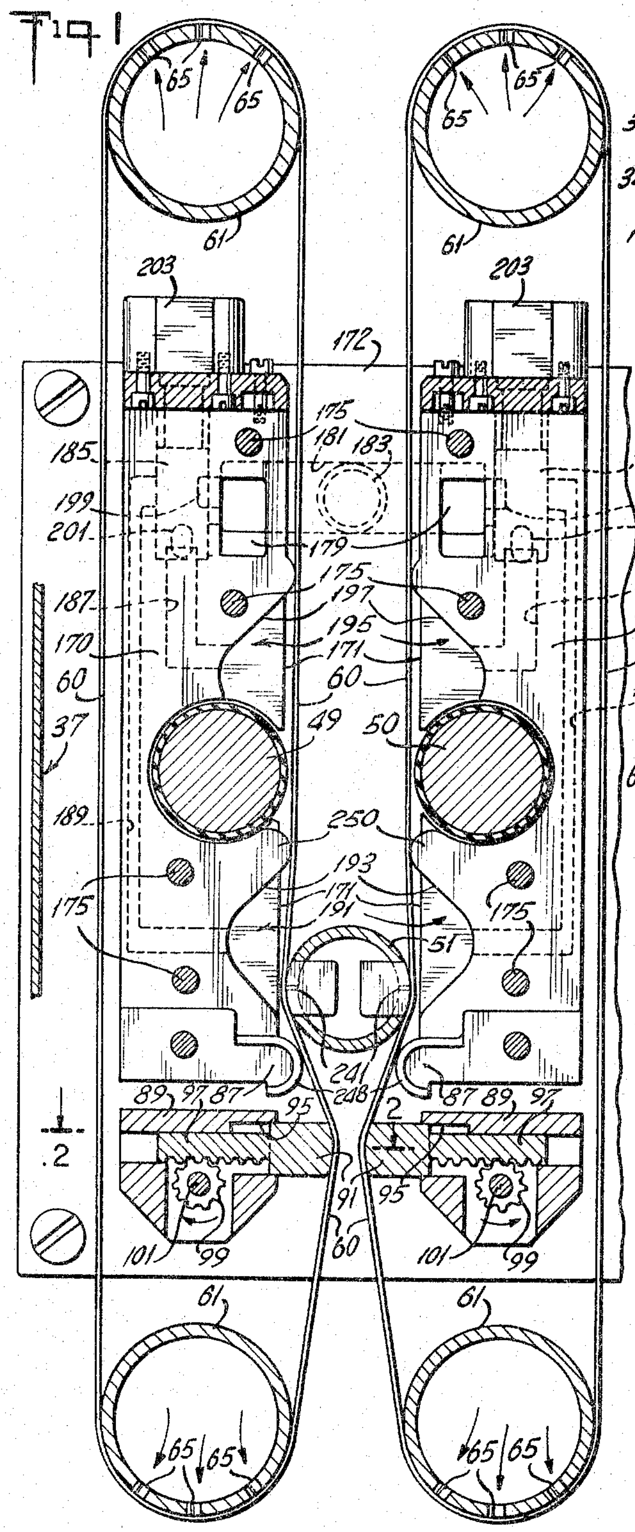
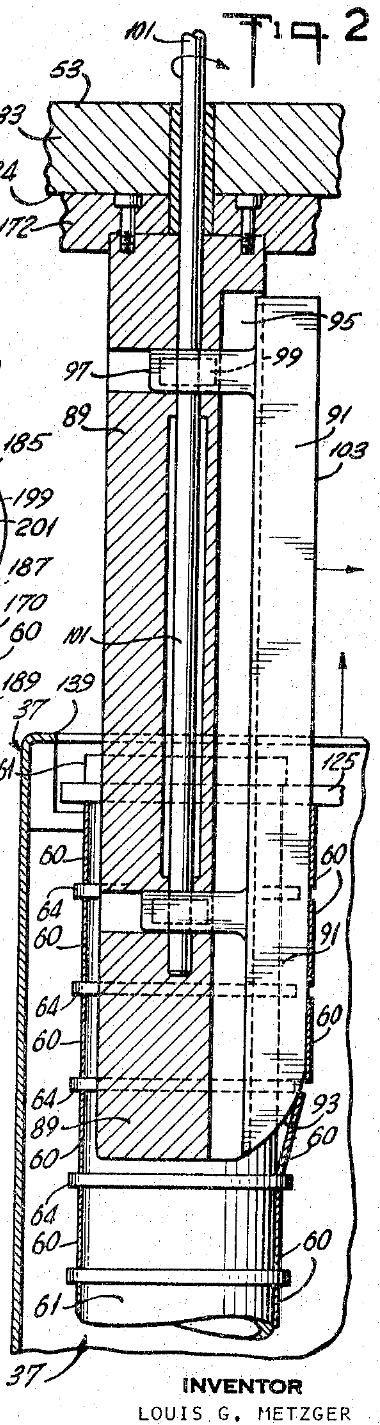
INVENTOR
LOUIS G. METZGER
BY
Douglas M. Clarkson
ATTORNEY INVENTOR
LOUIS G. METZGER
BY [signature]
ATTORNEY April 25, 1967 L. G. METZGER 3,315,861

MAGNETIC TAPE SUPPORT

Original Filed Oct. 30, 1964 14 Sheets-Sheet 3

INVENTOR
LOUIS G. METZGER

BY Douglas M. Clarkson
ATTORNEY

INVENTOR
LOUIS G. METZGER
BY Douglas M. Clarkson
ATTORNEY

INVENTOR
LOUIS G. METZGER
BY Douglas M. Clarkson
ATTORNEY

INVENTOR.
LOUIS G. METZGER

Douglas M. Clarkson
ATTORNEY

INVENTOR.
LOUIS G. METZGER
BY
Douglas M. Clarkson
ATTORNEY

April 25, 1967 L. G. METZGER 3,315,861

MAGNETIC TAPE SUPPORT

Original Filed Oct. 30, 1964

14 Sheets-Sheet 8

INVENTOR

LOUIS G. METZGER

BY Douglas M. Clarkson

ATTORNEY

INVENTOR
LOUIS G. METZGER
BY Douglas M. Clarkson
ATTORNEY

INVENTOR.
LOUIS G. METZGER
BY Douglas M. Clarkson
ATTORNEY

INVENTOR
LOUIS G. METZGER
BY Douglas M. Clarkson
ATTORNEY

April 25, 1967 L. G. METZGER 3,315,861

MAGNETIC TAPE SUPPORT

Original Filed Oct. 30, 1964

14 Sheets-Sheet 12

INVENTOR
LOUIS G. METZGER

BY Douglas M. Clarkson
ATTORNEY

INVENTOR
LOUIS G. METZGER
BY Douglas M. Clarkson
ATTORNEY

INVENTOR.
LOUIS G. METZGER
BY Douglas M. Clarkson
ATTORNEY

United States Patent Office 3,315,861

Patented Apr. 25, 1967

3,315,861
MAGNETIC TAPE SUPPORT

Louis G. Metzger, 549 Riverside Drive, New York, N.Y. 10027

Continuation of application Ser. No. 407,814, Oct. 30, 1964. This application May 6, 1966, Ser. No. 548,336
8 Claims. (Cl. 226—90)

This application is a continuation of the application Ser. No. 407,814, filed Oct. 30, 1964, and which is now abandoned.

This invention, generally, relates to information storage devices and, more particularly, to a magnetic tape, random access, information memory.

Random access memories are used in digital computers and other data processing equipment to store information to be used or operated upon by the data processing equipment and to provide such stored information to the data processing equipment quickly from any selected random location or "address" in the memory. The random access memories prior to the present invention, for given capacities of stored information, require too much time to find a selected random address at random and to read the information out from the selected address, or other mechanical limitations have made them impractical.

Accordingly, an object of the present invention is to provide an improved random access information storage memory.

Another object of the present invention is to provide a small compact random access information storage memory with a large capacity.

A further object of the present invention is to increase the capacity of random access memories.

A still further object of this invention is to provide a tape loop random access information storage memory in which the tape loops can be quickly and easily interchanged with other tape loops.

Another object of the present invention is to facilitate interchanging of tape loops in a storage device with other tape loops.

Still another object of the present invention is to facilitate the precise positioning of tape loops with respect to transducing units in a memory.

Yet another object of the present invention is to provide a random access memory in which tape loops can be interchanged with other tape loops with means to precisely position the tape loops with respect to the transducing units of the memory.

The present invention provides an improved random access memory device which has greatly increased capacity, yet which is small and compact, and in which access to any selected random address can be obtained in a minimum of time. In the device of the present invention, information is stored on tape loops. A plurality of tape loops are mounted in a cartridge, and each tape loop has a plurality of information tracks.

Means are provided to select one of the tape loops in the cartridge and one of the tracks on the selected tape loop for a transducing operation of either recording or reproducing. To further multiply the capacity of the memory, the cartridge is made interchangeable with other cartridges. When each cartridge is mounted for a transducing operation on the tapes in the cartridge, the tape loops must be positioned precisely with respect to a number of transducing units. This positioning of the tape loops is accomplished roughly with respect to the transducing unit in accordance with the present invention, by the tape loop supports, hereinafter referred to as "turn-arounds," and more precisely by the use of tape guides.

The turn-arounds in each cartridge are supported in the cartridge casing to permit limited movement of the turn-arounds with respect to the cartridge casing. When the cartridge is brought into position for a transducing operation, the turn-arounds are positioned precisely by means of magnets, which engage the ends of the turn-arounds and hold them magnetically in the desired precise position.

Means are provided to lift the turn-arounds in alignment with the magnets before the magnets engage the turn-arounds. By these magnets, the turn-arounds and, therefore, the tape loops are positioned precisely with respect to the transducing units.

Further objects and advantages of the present invention will become readily apparent as the following detailed description of the invention unfolds and when taken into conjunction with the drawings wherein:

FIG. 1 is a sectional view in elevation of a tape support constructed in accordance with the present invention as a tape cartridge is in the process of being moved into its transducing position;

FIG. 2 is a sectional view taken along lines 18—18 of FIG. 1;

Figure 13:
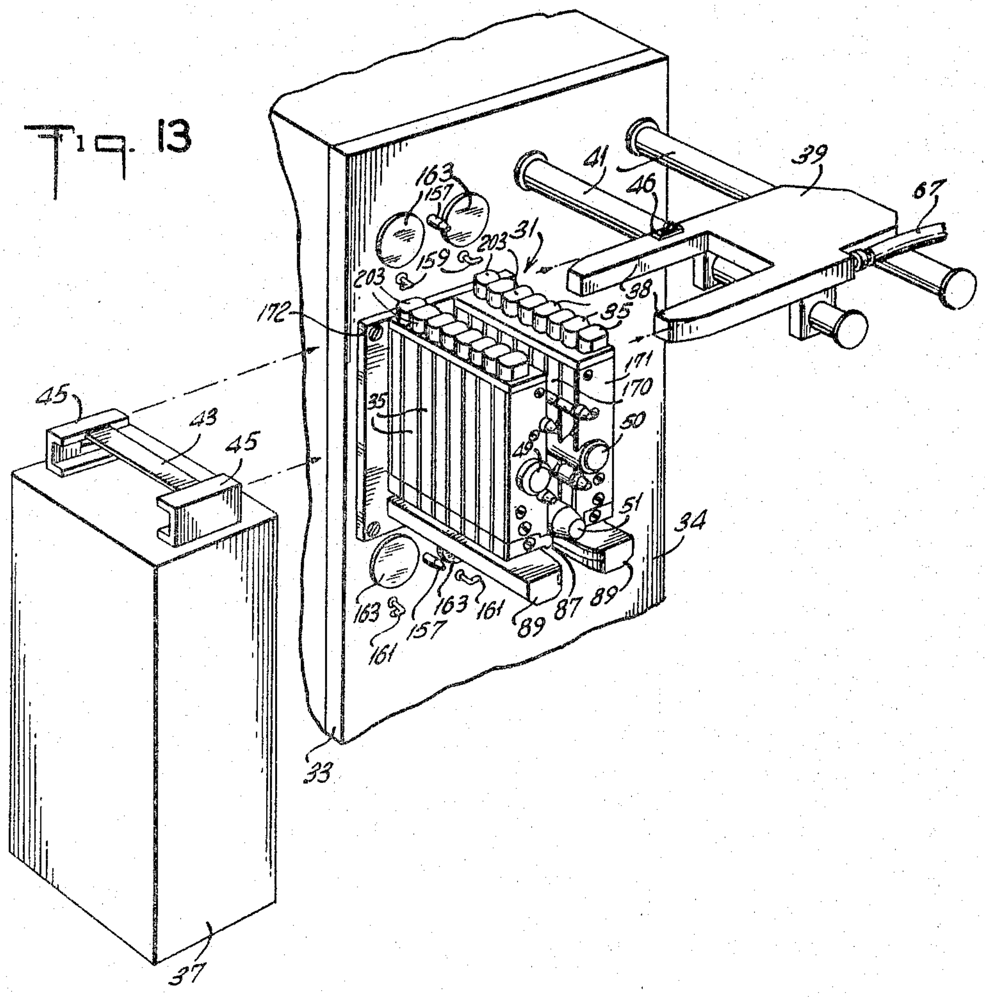
FIG. 13 is a perspective view of a random access memory of the present invention with one of the cartridges in which the tape loops are stored ready to be mounted.

Referring first to FIG. 13, a random access information storage memory in accordance with the present invention comprises a transducer assembly designated generally by the reference number 31. This transducer assembly is mounted on a supporting wall 33 and extends out horizontally from the front 34 of the wall 33. While any desired number of transducing units may be selected, the transducer assembly 31 shown in the drawings includes sixteen transducing units 35 arranged in two parallel rows extending out from the supporting wall 33. Each transducer unit 35 will function to record on or reproduce from a different one of sixteen magnetic tapes which are mounted in a removable cartridge 37.

The cartirdge 37 is removably mounted on two arms 38 of a carriage 39, which in turn is mounted slidably on two parallel bars 41. The bars 41 extend out horizontally from the front 34 of the supporting wall 33, and the carriage 39 is movable on the bars 41 between an "out" position, which is the position in which it is shown in FIG. 13, and an "in" position, in which the carriage is adjacent the wall 33.

When the cartridge 37 is mounted on the carriage 39 and when the carriage is slid from its "out" position to its "in" position, the cartridge 37 will surround the transducer assembly 31, and the tapes mounted in the cartridge will be brought in transducing relationship with the transducing units 35. Although only one cartridge is illustrated in FIG. 13, a plurality of similar cartidges are interchangeable so that access may be obtained readily to a large number of tapes.

Access to a tape which is not in the particular cartridge which is mounted on the carriage 39 is obtained simply by changing cartridges. A change of cartridges is achieved by moving the carriage from its "in" position to its "out" position, sliding the cartridge sideways off of the arms 38 of the carriage 39, sliding the new cartridge onto the arms 38, and then, sliding the carriage back to its "in" position, thus moving the tapes in the new cartridge into transducing relationship with the transducer units 35.

Figure 14:
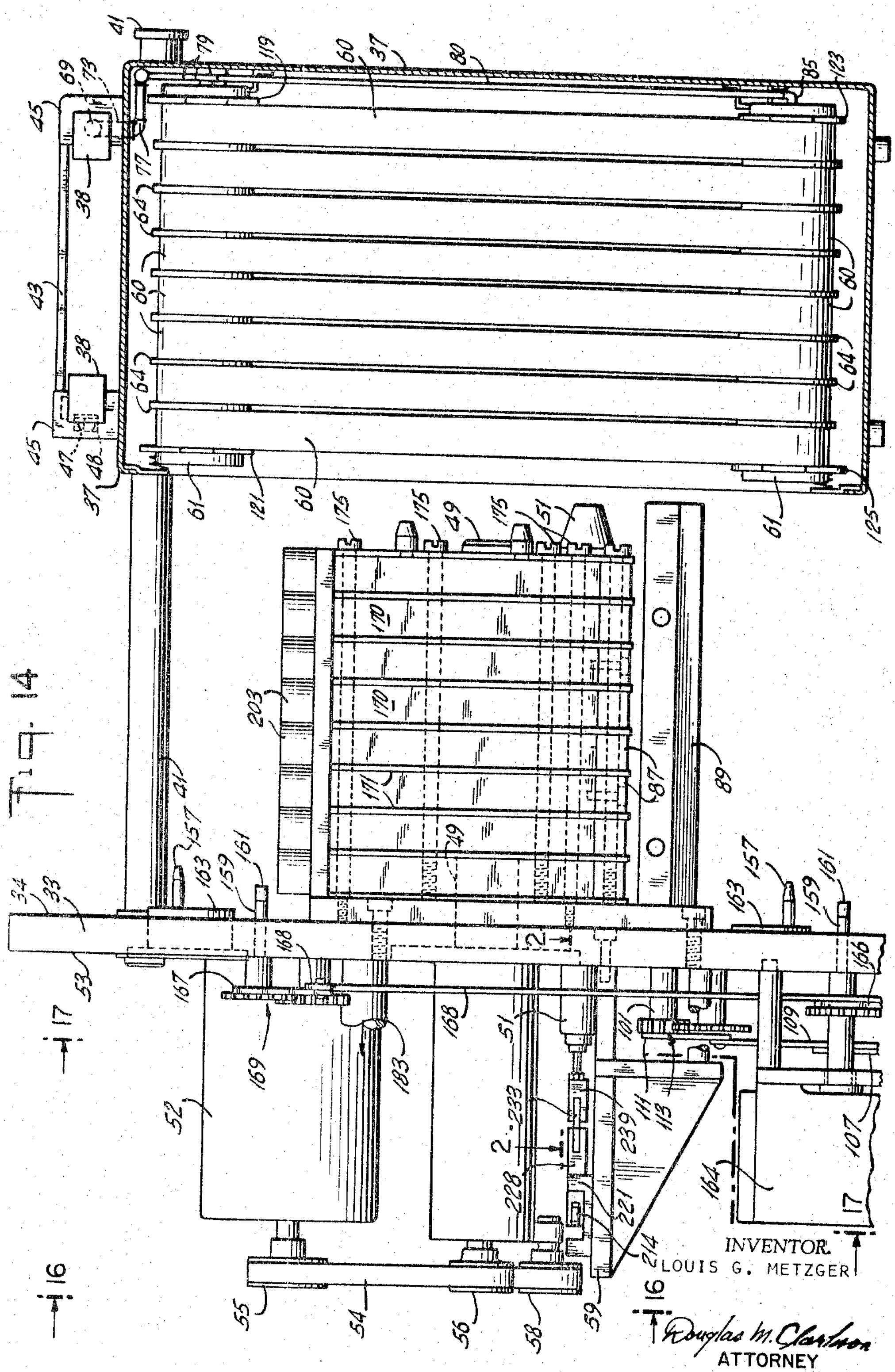
FIG. 14 is a side view in elevation of the random access memory of the present invention with a cartridge in the process of being mounted.
Figure 15:
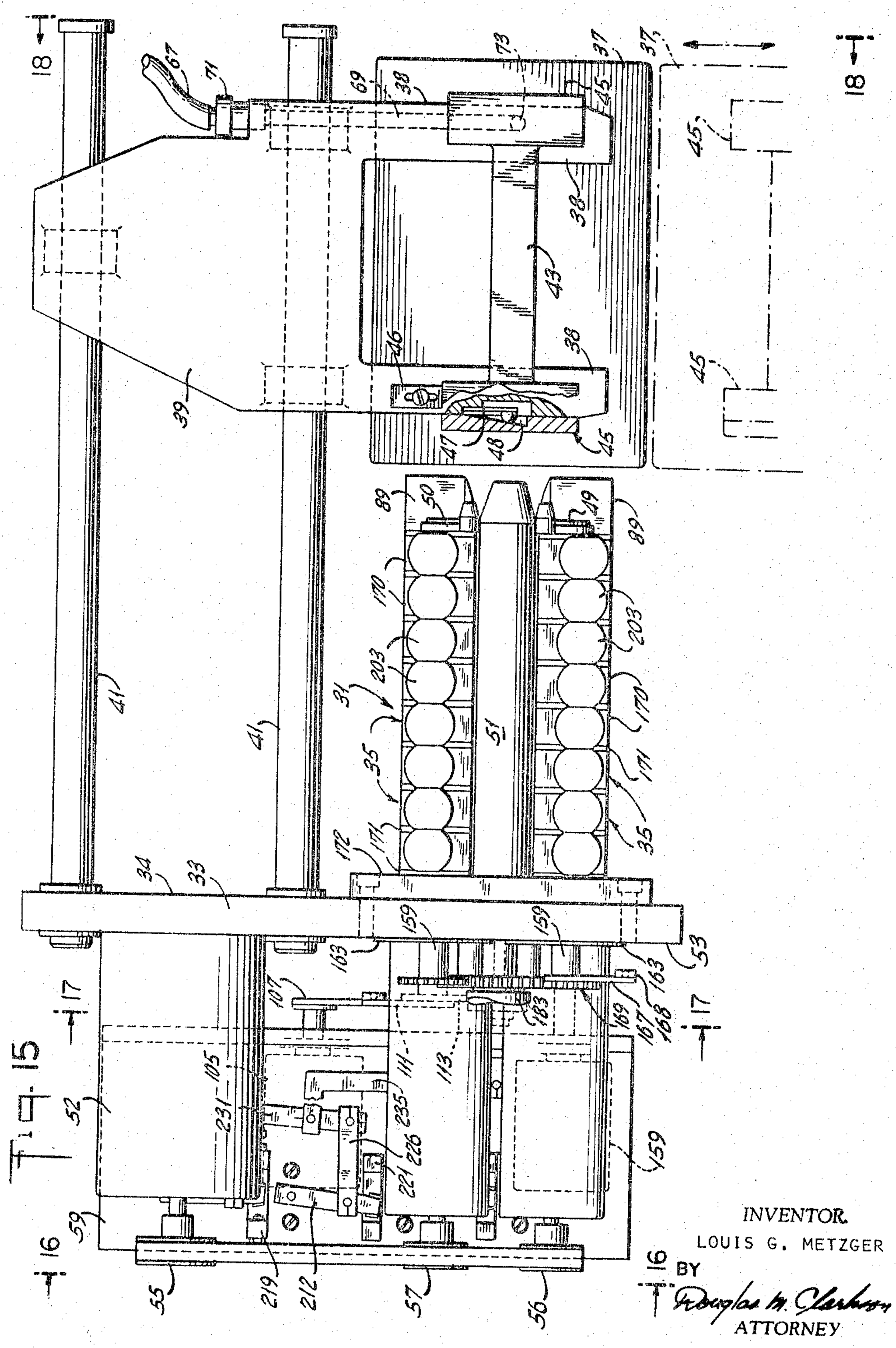
FIG. 15 is a top plan view of the random access memory with the cartridge in the same position as in FIG. 14.

As exxemplified by the cartridge 37 in FIG. 13, each cartridge is provided with a handle 43 mounted between two U-shaped brackets 45 which, as shown in FIGS. 14 and 15, fit around the arms 38 of the carriage 39 and make a sliding engagement with the arms 38, so that the brackets can be slid sideways over the arms 38 to remove the cartridge from or mount the cartridge on the carriage 39. When the cartridge is mounted on the carriage 39, it is slid onto the arms 38 until one of the U-shaped brackets 45 abuts against a stop 46 fixed to the top of the carriage 39. As shown best in FIG. 15, a spring detent 47 is mounted on one of the arms 38 to engage within a cavity 48 defined in the corresponding bracket 45 for holding the cartridge on the arms 38 after it has been slid against the stop 46.

The transducer assembly 31 is provided with means to select one of the sixteen tapes for a transducing operation and is provided with means to select one of a great number of tracks (such as forty-eight, for example) on the selected tape. These selecting means will be described in more detail presently. The transducing assembly 31 is provided with two capstans 49 and 50, each common to the transducer units 35 of a different row.

A cylindrical bar 51 carries magnetic transducer heads for each of the transducer units. The cylindrical bar 51 is referred to as a "head carrier." The capstans 49 and 50 are operable to drive the tapes mounted in the cartridge 37 when the cartridge 37 is mounted on the carriage 39 and is brought into its transducing position surrounding the transducing assembly 31. The capstans 49 and 50 are driven by a motor 52 mounted on the back 53 of the wall 33.

Figure 16:
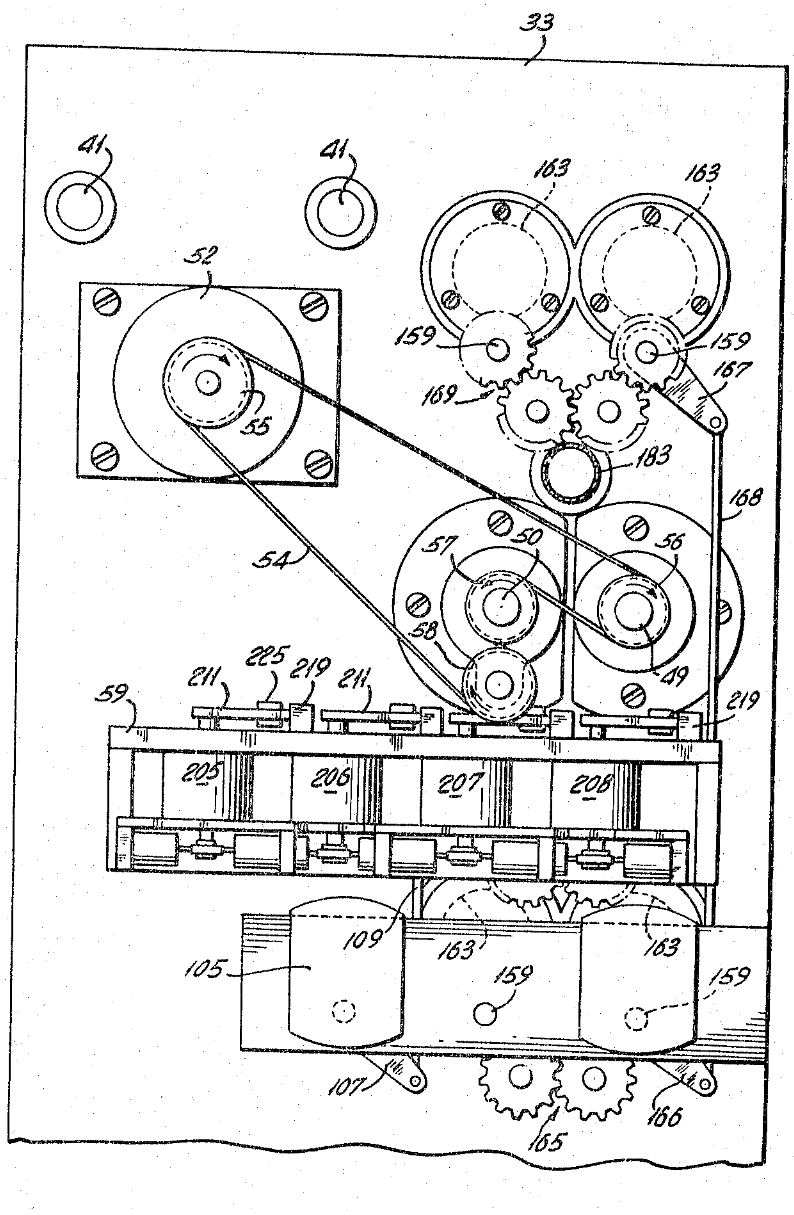
FIG. 16 is a view in elevation of the back of the random access memory.

The motor 52 drives the capstans 49 and 50 by means of a belt 54 that is best shown in FIG. 16. The belt 54 passes around a pulley 55 connected to the shaft of the motor 52, around pulleys 56 and 57 connected to the ends of the capstans 49 and 50, respectively, and around an idler pulley 58. The belt 54 wraps around the pulleys 56 and 57 to drive the capstans in opposite directions, and the idler pulley 58 serves to provide a sufficient wrap angle around the pulley 57 to enable the belt 54 to grip the pulley 57 sufficiently. The manner in which the capstans 49 and 50 drive the magnetic tapes will be described in more detail hereinafter.

A track selection on a preselected magnetic tape is made in part by moving the cylindrical head carrier 51 axially. This axial movement is produced by means of a whippletree mechanism 59 mounted on the back 53 of the wall 33 as shown in FIG. 16. The details of how the whippletree mechanism moves the head carrier 51 axially and how this axial movement makes a track selection on the selected magnetic tape will be described in more detail also hereinafter.

The magnetic tapes mounted in the cartridge 37 are in the form of endless tape loops arranged in two parallel rows of eight each to cooperate with the two parallel rows of transducer units 35. As shown in FIG. 14 and in FIGS. 19–22, the tape loops are designated generally by the reference number 60. Each row of eight tape loops is mounted and is supported between two cylindrical members 61 referred to as "turn-arounds." Since each row of eight tape loops requires two turn-arounds, each cartridge will have four turn-arounds 61.

A plurality of spaced-apart annular plates 64 are mounted on the turn-arounds 61, extending circumferentially around the turn-arounds. These plates 64 are axially spaced at regular intervals along the turn-arounds and define channels in which the tape loops are positioned on the turn-arounds. Thus, the plates 64 keep the tapes separated and in position and, therefore, are referred to as separator plates.

When one of the tape loops is selected for a transducing operation, the corresponding transducer unit 35 will bring the tape loop into engagement with either the capstan 49 or the capstan 50 and the selected capstan will drive the tape loop in a spinning fashion. As the tape is spun, it will move over the turn-arounds 61 on a cushion of air, which is referred to as an air bearing.

This cushion of air is produced between the turn-arounds 61 and the tapes 60 by air passing out from the hollow interiors of the turn-arounds through apertures 65 formed in that part of the turn-arounds 61 which is adjacent by the tape loops 60, as is illustrated best in FIGS. 19 and 20 and 3 and 4. The pressurized air is supplied to the turn-arounds 61 through the U-shaped brackets 45 from the arms 38 of the carriage 39. This feature is illustrated best in FIGS. 14, 15, 18 and 20.

Air is supplied to the carriage 39 through a flexible hose 67 which, by means of a fitting 71, connects to an air passageway 69 defined in the carriage 39. The passageway 69 extends out into one of the arms 38 to an opening 73 defined in the bottom of the arm 38. The opening 73 is positioned to be covered by one of the U-shaped brackets 45 when the cartridge 37 is mounted on the arms 38.

Figures 19, 20:
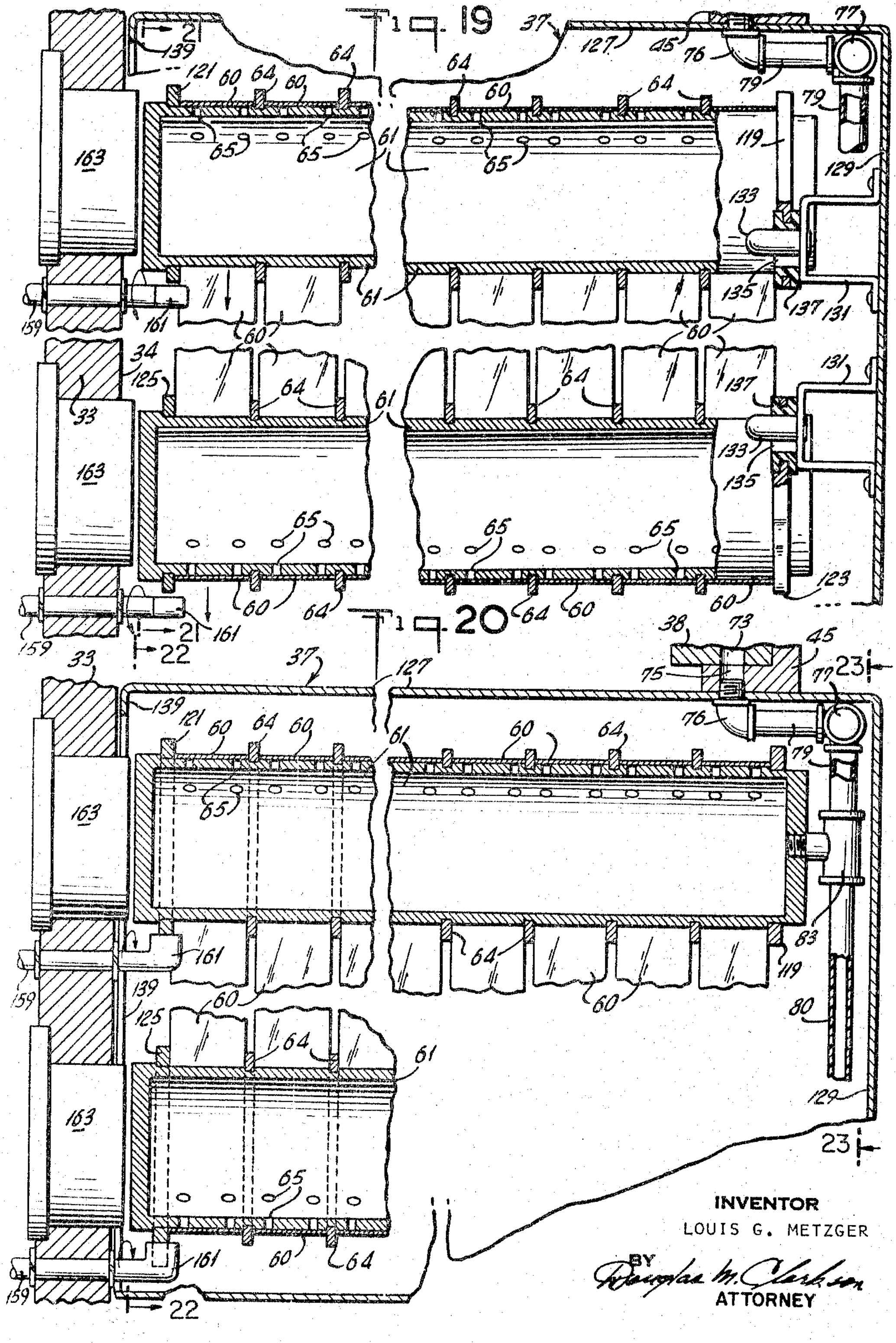
FIGS. 19 and 20 show sectional views partly broken away taken through a storage cartridge at different positions in the process of being mounted.

When the cartridge 37 is properly positioned on the arms 38 against the stop 46, the opening 73 will register with a corresponding opening 75 defined in the lower leg of one of the U-shaped brackets 45, so that the air supplied to the passageway 69 by the hose 67 will pass through the opening 73 and into the opening 75 when the cartridge 67 is mounted on the arms 38. The opening 75 is best illustrated in FIG. 20.

Figure 23:
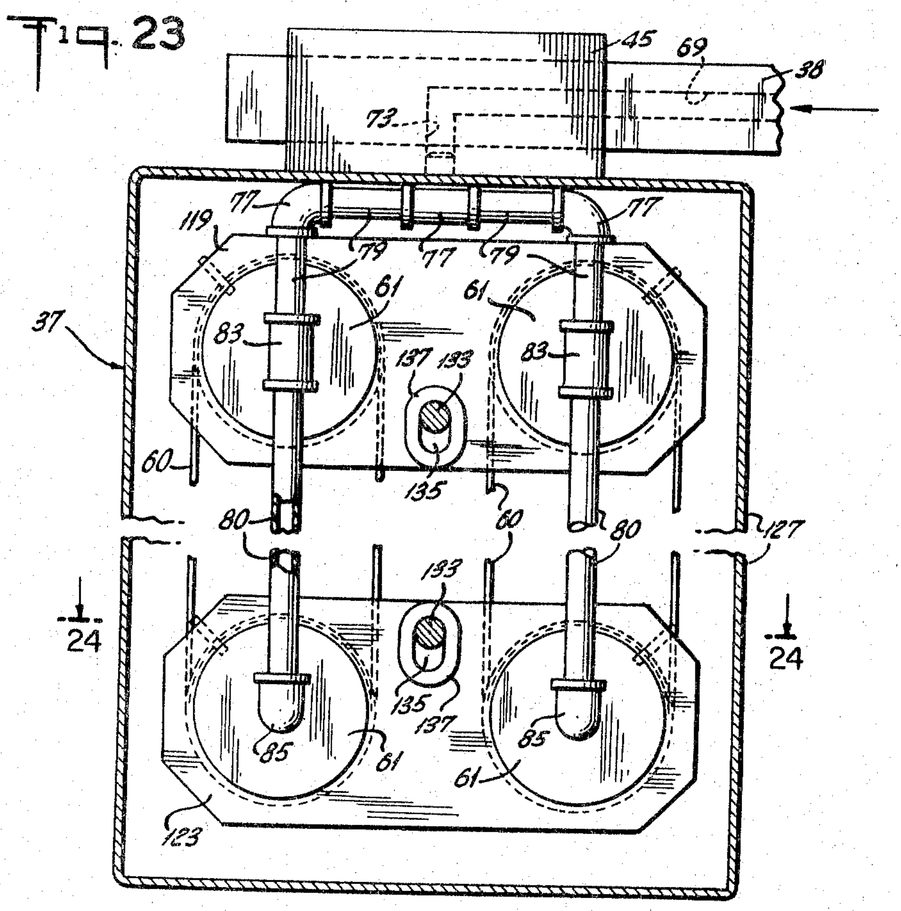
FIG. 23 is a sectional view taken along lines 11—11 of FIG. 20.

Air supplied from the hose 67, after passing through the passageway 69 into the opening 75, passes through passageways leading into the turn-arounds 61. These latter passageways are provided by hoses 79 and 80 and couplings 76, 77, 83 and 85 as shown in FIGS. 20 and 23. The hoses 79 and 80 are flexible for reasons to be explained below. In this manner, pressurized air is supplied to the hollow interior of the turn-arounds 61 and, thus, the cushions of air between the turn-arounds 61 and the tape loops 60 are generated.

Because the air pressure is supplied to the turn-arounds through the arms 38, the air cushions will be produced as soon as the cartridge 37 is mounted on the arms 38. This applies a slight tension to the tape loops 60 and, in this manner, keeps them in place while the carriage 39 is moving the cartridge to the position where it surrounds the transducer assembly 31. It is important that the tape loops 60 be held firmly in position while the cartridge is being moved by the carriage to the position surrounding the transducer assembly 31, because the tapes must be guided around obstructions.

These obstructions, which are tape guides for accurately positioning the tape loops when they are being driven by the capstans, are designated generally by the reference number 87 and can be seen in FIGS. 1 and 2, which figures also illustrate how the tape loops are guided around the tape guides 87 as the cartridge is being moved by the carriage 39 into or out from its transducing position.

As shown in FIGS. 1 and 2, a pair of spreaders 89, one for each row of tape loops, is provided below the two rows of transducer units 35. The spreaders 89 each comprise a tape cam 91 which is formed with an arcuate or curved surface 93 for guiding the tape away from the tape guides 87. The cams 91, which extend along the full length of the rows of transducer units 35, are movable in the horizontal direction parallel to the supporting wall 33. This lateral movement of the cams 91 is guided within grooves 95 defined in the spreaders 89 and is effected by means of racks 97 connected to the cams 91.

Figures 3, 4:
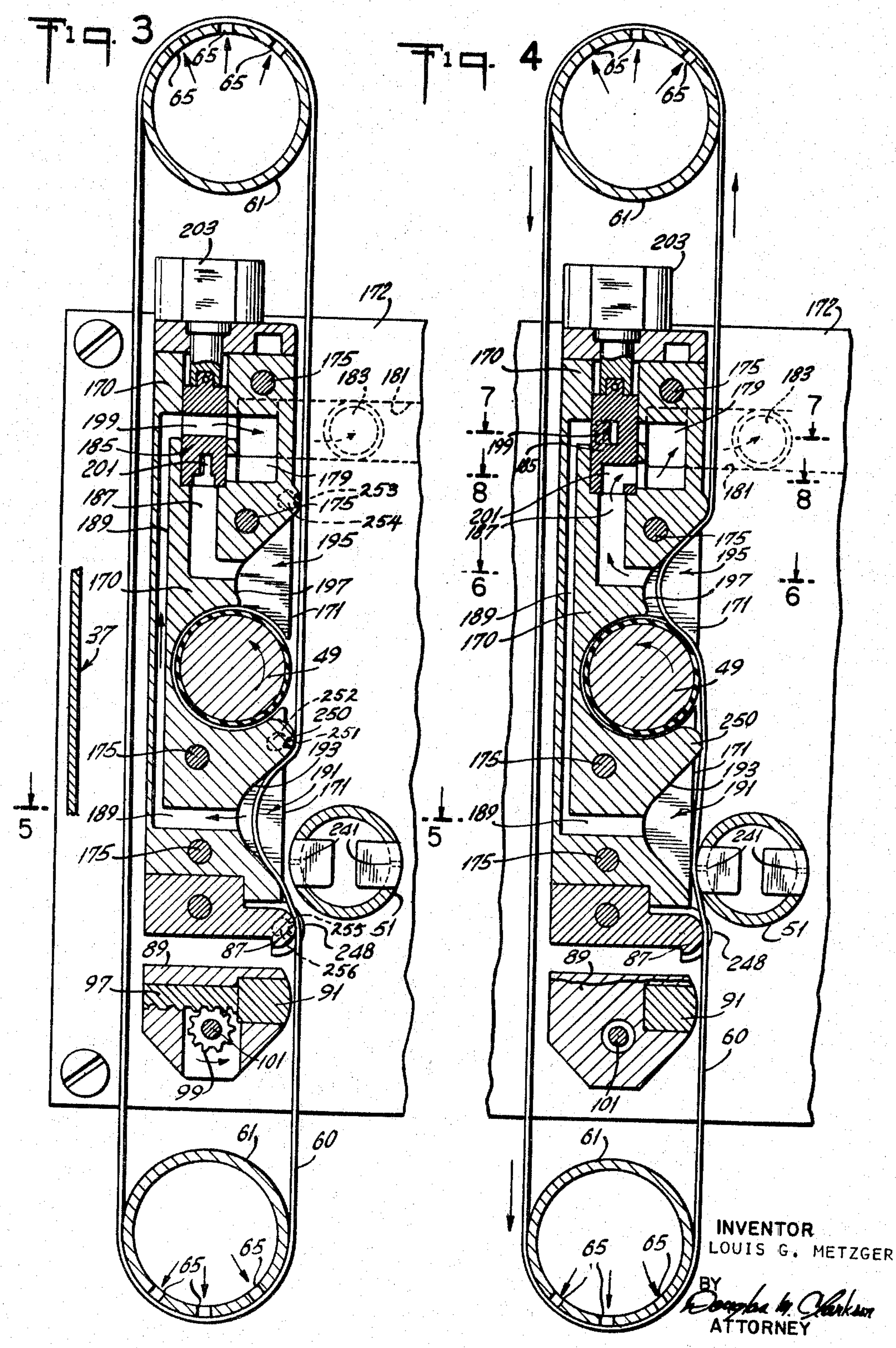
FIGS. 3 and 4 are sectional views in elevation taken through the tape support device with a tape mounted ready for a transducing operation, with FIG. 3 illustrating the position of a tape loop when a transducing operation is not being carried out and FIG. 4 illustrating the position of a tape loop when a transducing operation is being carried out.

Each cam 91 is connected along the lengths of two racks 97 at spaced-apart points, and the racks 97 coact with pinions 99 mounted on and fixed to shafts 101. The shafts 101 extend through the spreaders 89 and through the wall 33. When the shafts 101 are rotated, the pinions 99 drive the racks 97 to move the tape cams 91 laterally between their extended positions, in which they are shown in FIGS. 1 and 2 and their retracted positions in which they are shown in FIGS. 3 and 4.

When a cartridge is moved by the carriage from the position shown in FIG. 14 to the transducing position where the cartridge surrounds the transducer assembly 31, the tape cams 91 will be in their extended position. Then, when the cartridge is moved by the carriage toward the wall 33, the tapes 60 will be moved successively into engagement with the arcuate surface 93 and be cammed out to a position where they clear the guides 87. The tapes also come into engagement with the beveled nose of the head carrier 51 at the same time that they come into engagement with the tape cams 91 and are guided to the sides of the head carrier.

Each of the cams 91 is provided with an elongated straight surface 103 extending perpendicular to the wall 33. This surface 103 holds the tapes 60 in a position where they clear the tape guides 87 until the cartridge has moved all the way into its transducing position. The shafts 101 then are rotated to move the cams 91 to their retracted position. This permits the tapes 60 to fall back on the tape guides 87, as shown in FIGS. 3 and 4, where the tapes are ready for a transducing operation.

In a similar manner, when it is desired to remove a cartridge from the transducer assembly, the shafts 101 are rotated first to extend the cams 91, thereby moving the tapes 60 to the position where they clear the tape guides 87. The carriage 39 then moves the cartridge out from its transducing position while the cams 91 maintain the tapes 60 clear of the tape guides 87. It is important that tape loops 60 be maintained in slight tension when the cartridge is being moved into or out from its transducing position because the tensioning of the tape loops prevents the tape loops from being dragged sideways by the cams 91 as the cartridge is being moved. As described above, this tensioning of the tape loops 60 is provided by the air passing through the apertures 65 in the turn-arounds 61.

Figure 17:
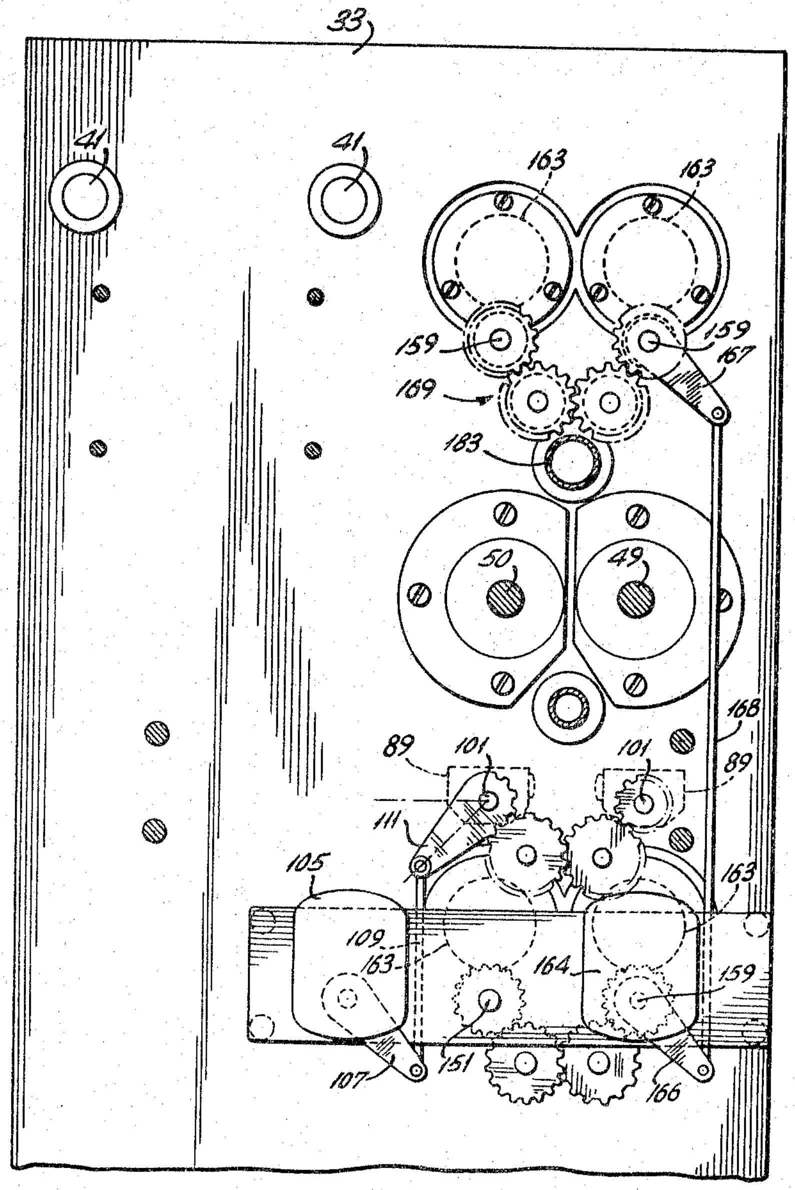
FIG. 17 is a sectional view showing the back of the memory taken along lines 5—5 of FIGS. 14 and 15.

The shafts 101, which drive the cams 91, are in turn driven by a motor 105 mounted on the back 53 of the wall 33 as best shown in FIG. 17. The motor 105 actuates the crank arm 107 and operates to move the crank arm 107 between two positions, one being the position shown in FIG. 17 at a 45° angle and the other position being horizontal.

A link 109 is connected pivotally at one end to the end of the crank arm 107 and is connected pivotally at the other end to a crank arm 111, so that movement of the crank arm 107 between its two extreme positions will move the crank arm 111 between the position in which it is shown in FIG. 17 and a horizontal position, as indicated. The crank arm 111 is fixed to one of the shafts 101 and rotates it between the two positions, one being where the cam 91 driven thereby is in its retracted position and the other being where the cam 91 is in its extended position. A gear segment on the crank arm 111 drives the other shaft 101 through a gear train 113 between the two positions where the cam 91 driven thereby is in its extended and retracted positions.

As shown in FIGS. 19, 20, 21 and 22 the upper turn-arounds 61 are mounted between and fixed to a pair of plates 119 and 121, and the lower turn-arounds 61 are mounted between and fixed to a pair of plates 123 and 125. The plates 119, 121, 123 and 125, together with the adjacent channel separators 64, define the tape channels on the turn-arounds for the tapes on the ends of the two rows of tape loops.

The ends of the upper turn-arounds 61 extend through the plate 119 to receive the couplings 83, through which air passes into the upper turn-arounds 61. The ends of the lower turn-arounds 61 extend through the plates 123 to receive the couplings 85 through which air passes into the interior of the lower turn-arounds.

Figure 24:
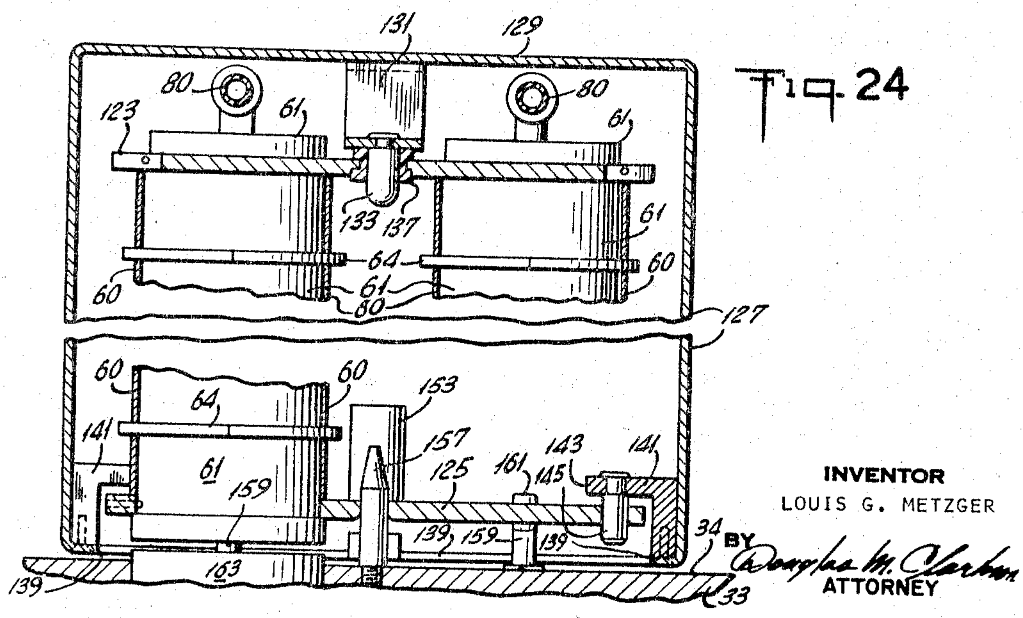
FIG. 24 is a sectional view taken along lines 12—12 of FIGS. 22 and 23.

The cartridge is provided with a casing 127 having an end wall 129. As shown in FIGS. 19, 23 and 24, a pair of brackets 131 are mounted on the inside of the end wall 129, and a pin 133 is mounted on each bracket 131 projecting horizontally into the casing 127. The pins 133 are positioned vertically one above the other and are received in slots 135 vertically disposed in the plates 119 and 123. Elongated grommets 137 are mounted in the slots 135 surrounding the pins 133, fitting closely against the sides of the pins 133 but permitting limited vertical relative movement between the pins and the plates 119 and 123.

Figure 21:
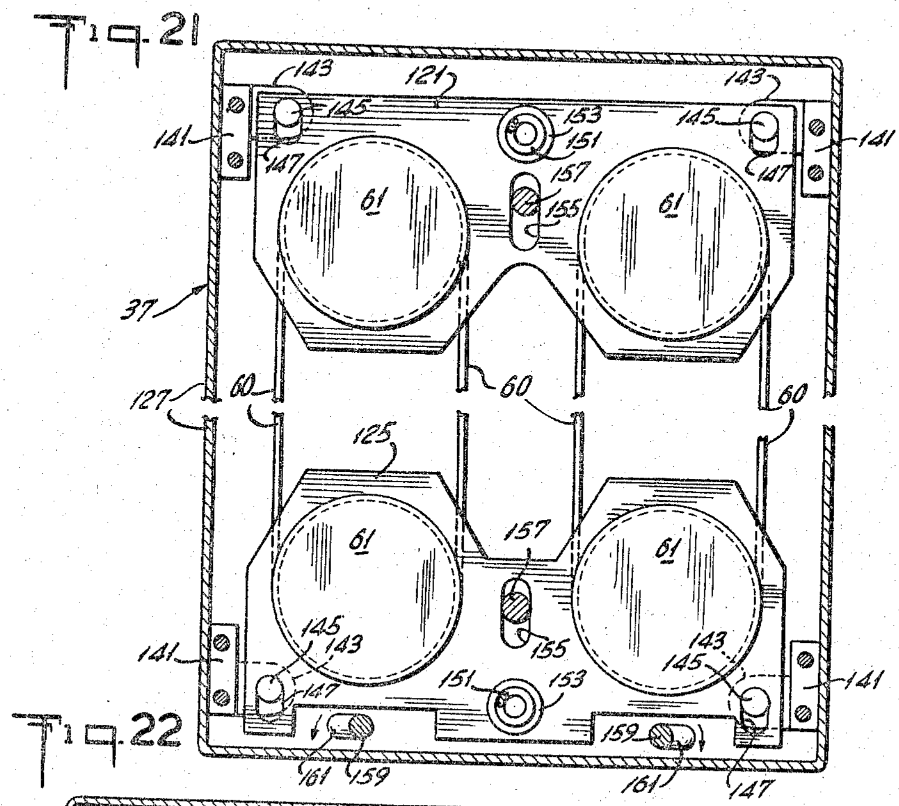
FIG. 21 is a sectional view taken along lines 9—9 in FIG. 19.
Figure 22:
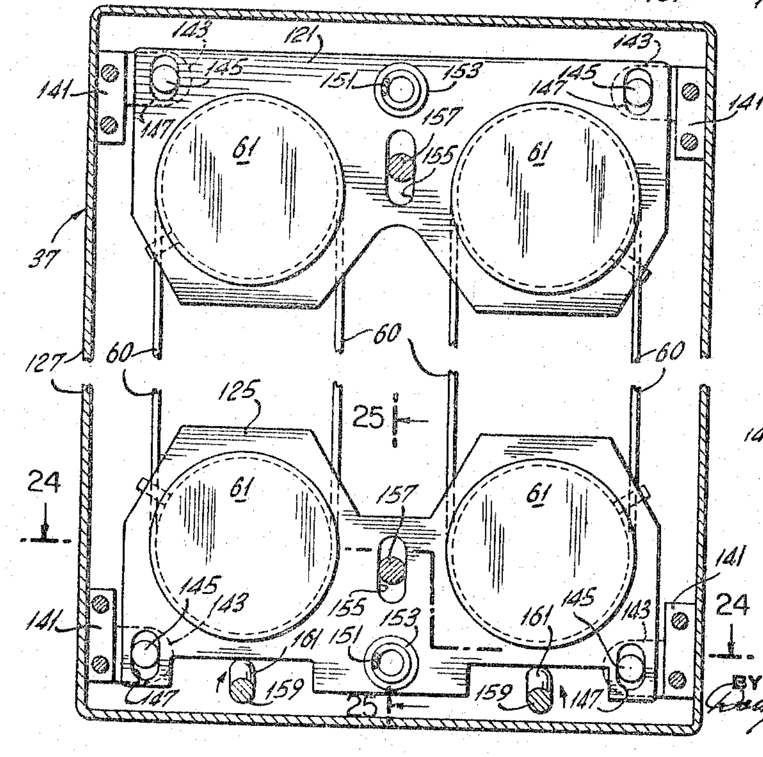
FIG. 22 is a sectional view taken along lines 10—10 of FIG. 20.

As shown in FIGS. 19 and 20, the front end of the cartridge casing 127 opposite the end wall 129 is open, and a lip 139 is provided around the opening. As best shown in FIGS. 21, 22 and 23, four L-shaped brackets 141 are fixed to the lip 139 within the corners defined by the lip and the side walls of the casing 127. These brackets have legs 143 which project behind the plates 121 and 125. A pin 145 is mounted in each leg 143 extending toward the front of the casing 127. The pins 145 are received in vertically disposed slots 147, which are defined in the plates 121 and 125 and which fit closely to the sides of the pins 145 but permit limited relative vertical movement between the pins 145 and the plates 121 and 125.

Figure 25:
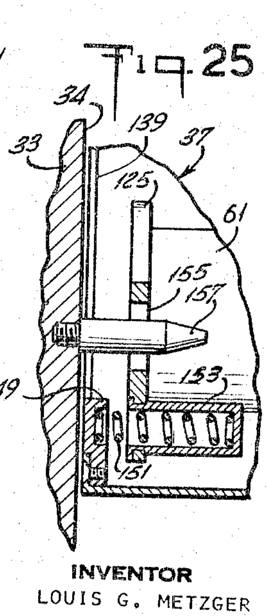
FIG. 25 is a sectional view taken along lines 13—13 of FIG. 22.

As is best shown in FIG. 25, a shallow spring receptacle 149 is fixed to the inner side of the lip 139 at the middle of the bottom wall of the casing 127. A coil spring 151 fits into the receptacle 149 and extends horizontally into a deep spring receptacle 153 fixed to the bottom of the plate 125. A similar spring and receptacle arrangement is provided between the top of the plate 121 and the lip 139 at the middle of the top wall of the casing. When the cartridge is not in its transducing position, the assemblies of the turn-arounds 61 and the plates 119, 121, 123 and 125 are supported in the casing by means of the pins 133 and 145, and the assemblies are forced back in the casing 127 by the springs 151 so that the grommets 137 abut against the brackets 131. The space between the legs 143 of the brackets 141 and the plates 121 and 125 permits the assemblies of the turn-arounds and the plates to have limited horizontal movement against the force of the springs 151.

The plates 121 and 125 have vertically disposed slots 155 defined therein between the turn-arounds 61. These slots receive pins 157 fixed to the front of the wall 33 when the cartridge is moved to its transducing position by the carriage 39. The pins 157 are provided with beveled ends and fit closely against the sides of the slots 155 but permit limited relative vertical movement between the pins and the plates 121 and 125. When the cartridge is moved into its transducing position by the carriage 39, the beveled ends of the pins 157 guide the slots 155 over the pins so as to align the turn-arounds 61 horizontally.

When the carriage 39 is moved to its "in" position, the cartridge that it carries will be brought to the position illustrated in FIGS. 19 and 21. The plates 121 and 125 will each be positioned over the ends of a pair of shafts 159 which extend through, and are rotatably mounted, in the wall 33. The shafts 159, which will be positioned directly beneath the lower turn-arounds 61, have formed on their ends short radially extending arms 161.

The shafts 159 are rotatable between the position where the arms 161 extend horizontally outward and the position where the arms extend vertically upward. When the cartridge is moved to the position shown in FIGS. 19 and 21, the arms 161 will be extending horizontally outward.

After the cartridge has been moved to the position shown in FIGS. 19 and 21, the shafts 159 are rotated to turn the arms 161 to their vertical positions. The arms 161 then will engage the bottoms of the plates 121 and 125 directly beneath the turn-arounds and lift the plates to the position illustrated in FIGS. 20 and 22. The ends of the turn-arounds 61, which extend through the plates 121 and 125, then will be aligned with the poles of magnets 163, which preferably are the electromagnet type.

During the interval when the carriage 39 is moving the cartridge into position, it is preferable that the tape loops be kept relatively taut, so that they can be guided past several of the structural elements. However, once the cartridge is in position, some slack must be developed in a rather exact amount so that, for example, the loops may be whirled around completely free from the stationary supports and loops of tape may be drawn into the pocket 191 or the pocket 195.

The slack in the tape must be just suffcient to wrap around as much of the respective capstans 49 and 50 as will accomplish a driving of the tape but not to develop a loop long enough to block the vacuum port. By way of example, FIG. 4 shows the tape wrapped sufficiently around the capstan for driving purposes and shows that the slack is just suffcient to limit the loop of tape in the pocket 195 so that the passageway opening into the pocket 195 is not blocked.

Since it is desired to have many interchangeable cartridges, each one must permit its tape loops to be positioned accurately on the apparatus relative to the information transferring station. Therefore, the two lower arms 161 lift the plate 125 to develop approximately the desired amount of slack in the tape loops 60, and the two upper arms 161 lift the plate 121 to create a precise separation between the lower and upper turn-arounds 61 to develop a more precise amount of slack. After this precise positioning of the tape has been accomplished, the electromagnets 163 are energized.

The ends of the turn-arounds 61 are made of a low reluctance material so that the electromagnets 163 will exert a pulling force on the ends of the turn-arounds 61. When the turn-arounds have been lifted to the position shown in FIGS. 20 and 22, the force exerted by the electromagnets 163 will become sufficiently strong to overcome the force of the springs 151, and the ends of the turn-arounds will be pulled against the faces of the permanent magnet poles. The faces of the permanent magnet poles are machined so as to be precisely flat and precisely in the same vertical plane.

The ends of the turn-arounds are machined also so as to be precisely flat and to be precisely perpendicular to the axes of the turn-arounds. As a result, when the turn-arounds are pulled into engagement with the electromagnets, they will all be aligned to have their axes aligned precisely horizontally and to have their channels precisely aligned with the transducing units 35. The slots in the plates 119, 121, 123 and 125 are elongated, and the flexible hoses 79 and 80 are flexible, to permit the motion of the turn-arounds under the action of the arms 161 and the magnets 163.

In this manner, the magnetic tape loops are positioned precisely with respect to the transducing units and this precise positioning is obtained with interchangeable cartridges.

The shafts 159 are driven between their two positions by means of a motor 164 mounted on the back of the wall 33, as is best illustrated in FIG. 17. The motor 164 directly drives one of the lower shafts 159 between its two angular positions and drives the other one of the lower shafts 159 between its two angular positions through a gear train 165. One of the upper shafts 159 is driven between its two angular positions by means of crank arms 166 and 167 and a link 168. The crank arm 166 is driven directly by the motor 164; the crank arm 167 drives the upper shaft 159, and the link 168 provides the driving connection between the crank arms 166 and 167. A gear segment on the crank arm 167 drives the other upper shaft 159 between its two angular positions through a gear train 169.

It will be understood that any suitable position limiting means may be used if desired to control the movement of the crank arms 166 and 167 for developing the required rotational movement. For example, electrical switches such as microswitches, not illustrated, may be positioned to cooperate with the crank arms 166 and 167.

As shown in FIGS. 3–8, the transducing units 35 each comprise a drive block 170, and the drive blocks of each row of transducing units are separated by plates 171. A plate 171 also separates the innermost drive block of each row of transducing units from a mounting plate 172 on which the rows of transducing units are mounted directly. The mounting plate 172 is fastened on the wall 33 by means of screws.

Figure 18:
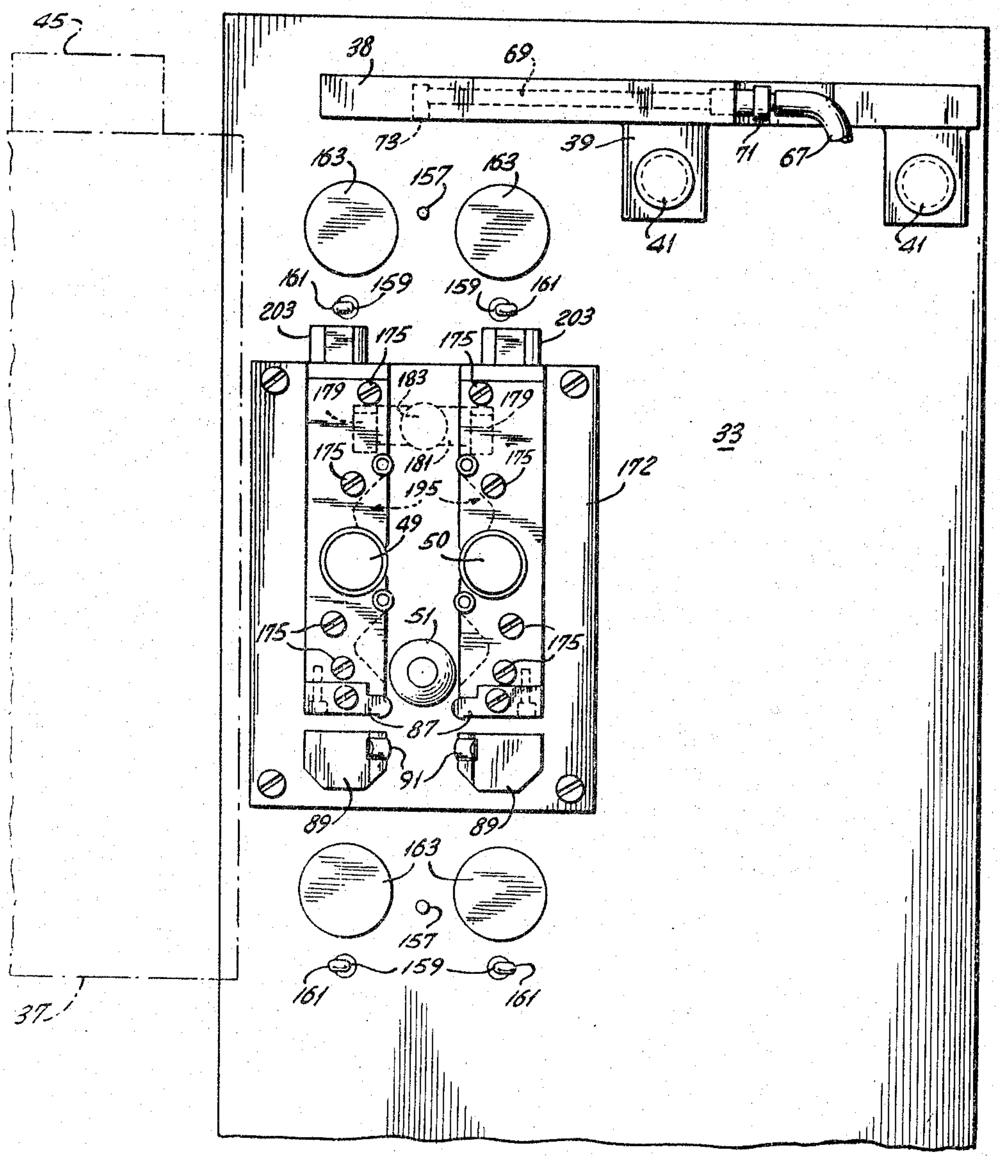
FIG. 18 is a front view in elevation of the random access memory with a cartridge containing the magnetic tape loops shown in phantom about to be mounted.

In FIG. 18, an end plate 173 covers the outermost drive block in each row. The assemblies of drive blocks and plates 171 and 173 are held together and fastened to the mounting plate 172 by means of screws 175 which pass through the entire row of drive blocks and are threaded into the mounting plate 172. A rectangular opening is defined through each drive block so that the assembly of drive blocks in each row together with the plate 173, which covers the opening in the outermost drive block, defines a manifold chamber 179 extending along the length of the row of transducer units.

The plates 171 are apertured in register with the openings that define the manifold chambers 179. A vacuum pump is connected to draw air from the manifold chambers 179 through a passageway 181 defined in the assembly of the mounting plate 172 and the supporting wall 33. The vacuum pump connects to the passageway 181 by means of a hose 183. A valve mechanism 185 is provided in each drive block to connect the manifold chamber 179 selectively either to a passageway 187 defined in the drive block or to a passageway 189 defined in the drive block.

While the cartridge is being moved to its transducing position, the vacuum pump will not be energized. After the cartridge has been moved to its transducing position and the turn-arounds have been pulled into engagement with the magnets 163, the vacuum pump will be energized to draw air from the manifold chambers 179 extending along each row of transducer units. At this time all of the valve mechanisms 185 will be positioned to connect the manifolds 179 to the passageways 189.

The magnetic tape loops on the cartridge will be drawn to the position illustrated in FIG. 3 when the vacuum pump is energized.

As illustrated in FIG. 2, each drive block is surrounded by a tape loop, which is drawn into a pocket 191 in the front of the transducing unit defined by a contoured depression 193 in the drive block and the separating plates 171 extending up between the depressions 193. The pocket 191 is positioned opposite the head carrier 51 and extends up above the head carrier. The passageway 189 communicates with the pocket 191 in each drive block so that air being drawn through the passageway 189 into the manifold chamber 179 will pull the tape loop into the pocket 191.

Figure 5:
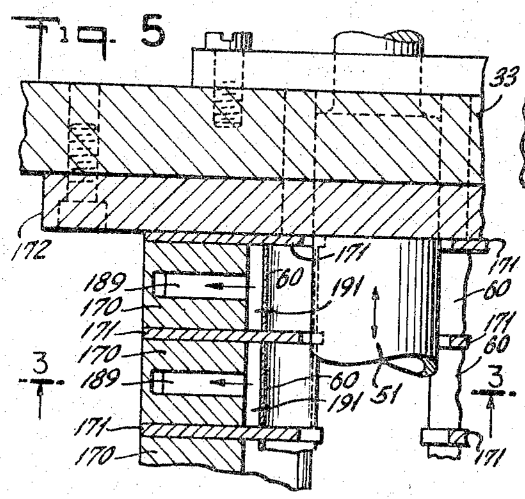
FIG. 5 is a sectional view taken along lines 21—21 of FIG. 3.

The sectional view in FIG. 5 shows the pocket 191 with the tape loops 60 drawn therein.

The drive blocks of each row of transducing units 35 are contoured to closely surround over half the cylindrical surface of the capstans 49 and 50 extending along each row. The separator plates 171 surround over three-quarters of the cylindrical surface of the capstans.

A second pocket 195 is formed above the capstan in each transducing unit. This pocket 195 is defined by a contoured depression 197 in the front of the drive block 170, the capstan itself, to which the depression extends, and the separating plates 171 which extend up between the depressions 197 and around the capstan. The pocket 195 in front of each transducing unit communicates with the passageway 187 defined in the drive block of the transducing unit.

When it is desired to perform a transducing operation on one of the tape loops, the valve mechanism 185 in the transducing unit for the selected tape is turned to communicate the manifold chamber 179 with the passageway 187 in this transducing unit. As a result, air will be drawn in through the pocket 195 of this transducing unit and through the passageway 187 into the manifold chamber 179, and the flow of air into the pocket 191 and through the passageway 189 will be cut off.

As a result, the tape loop will be drawn into the pocket 195 and will be released from the pocket 191. Accordingly, the tape will assume the position shown in FIG. 4.

Upon being drawn into the pocket 195, the tape loop is brought into contact with the capstan and upon being released from the pocket 191, is brought adjacent the head carrier as shown in FIG. 4. As a result, the tape will be driven by the capstan.

Figure 6:
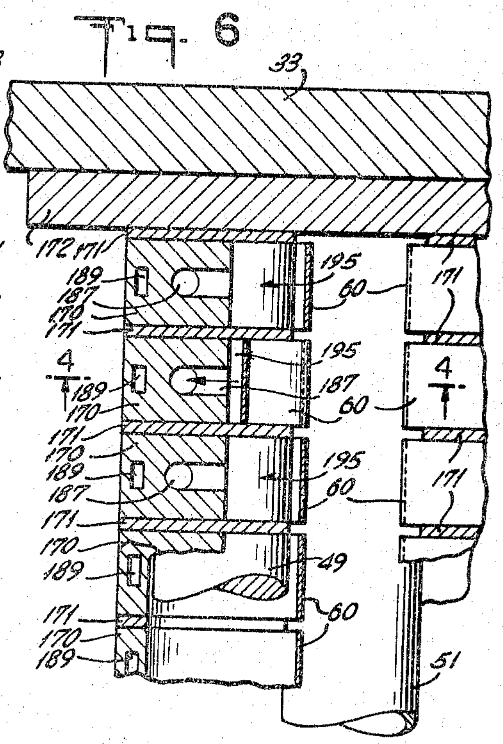
FIG. 6 is a sectional view taken along lines 22—22 of FIG. 4.
Figure 7:
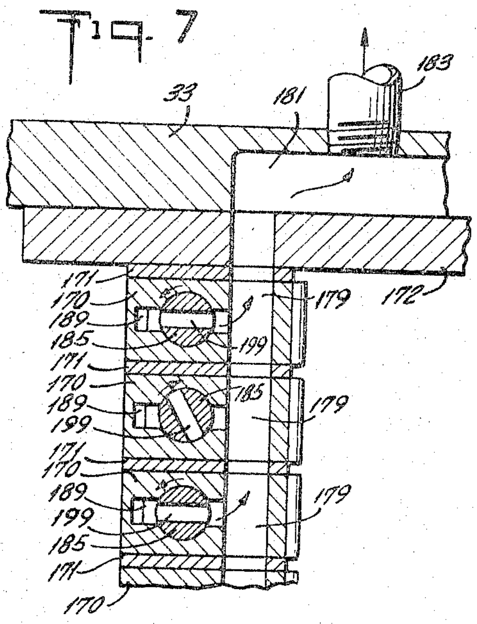
FIG. 7 is a sectional view taken along lines 23—23 of FIG. 4.
Figure 8:
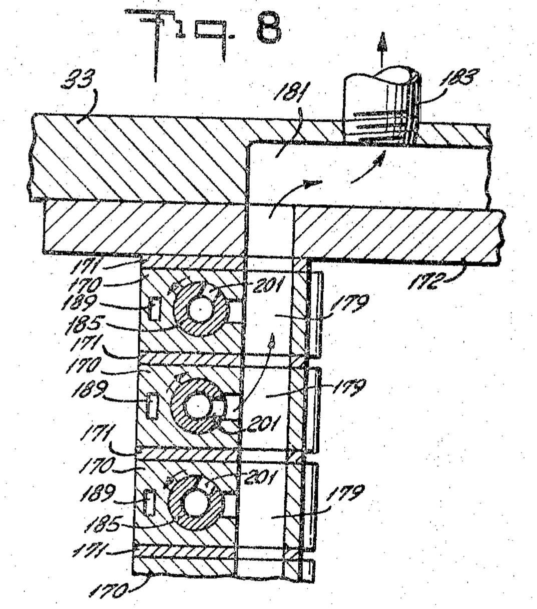
FIG. 8 is a sectional view taken along lines 24—24 of FIG. 4.

In the illustration of FIG. 4, the capstan rotates counterclockwise, thus driving the tape in a counterclockwise direction. The sectional view in FIG. 6 shows the pockets 195 with a tape loop 60 drawn into the second pocket 195 from the top.

As shown in FIG. 4, the head carrier is positioned so that the tape wraps slightly around it when it is released from the pocket 191, but as will be described in more detail below, an air bearing is generated between the tape and the head carrier, so that the tape does not actually come into contact with the head carrier. In this manner, the magnetic tape is brought into transducing relationship with the magnetic recording heads in the head carrier and is driven past these magnetic heads for a transducing operation.

The valve mechanism 185, as shown in FIGS. 3, 4, 7 and 8 comprises a cylindrical body, through which passageways 199 and 201 are formed. The cylindrical body is turnable in a bore defined in the drive block 170 between two positions by means of a rotary solenoid 203 which is mounted on top of the drive block.

In one position of the valve mechanism, the passageway 199 connects the manifold chamber 179 to the passageway 189, and in the other position, the passageway 201 connects the manifold chamber 179 to the passageway 187. Thus, the rotary solenoid 203, by rotating the valve mechanism 185 between its two positions, can connect the manifold chamber 179 selectively to either the passageway 187 or 189, and a magnetic tape loop can be selected for a transducing operation by energizing the proper rotary solenoid 203 to turn the corresponding valve mechanism 185, to communicate the manifold chamber 179 with the passageway 187 in the corresponding transducing unit.

Figure 26:
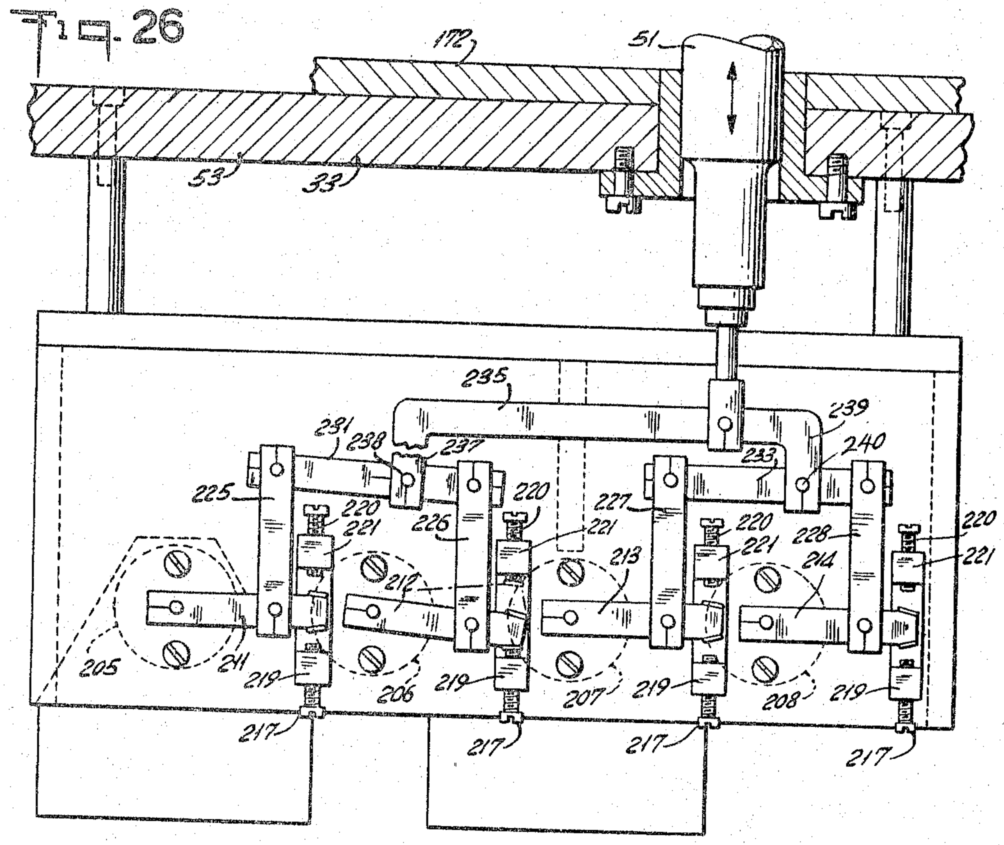
FIG. 26 is a sectional view taken along lines 14—14 of FIG. 14 illustrating a mechanism for selecting a track on the selected tape.

As best shown in FIG. 26, the whippletree mechanism, which controls the positioning of the cylindrical head carrier, comprises four rotary solenoids 205, 206, 207 and 208. The rotary solenoids 205 through 208 drive the crank arms 211 through 214, respectively, and operate to position the crank arms 211 through 214 either in a first position or in a second position.

The crank arms are disposed generally along a line perpendicular to the axis of the cylindrical head carrier 51. In their first positions, the crank arms 211 through 214 engage the ends of the screws 217, which are threaded through the blocks 219. By turning the screws 217 in the blocks 219, the first positions of the crank arms 211 through 214 can be adjusted individually.

The crank arms 211 through 214 engage the ends of screws 220 when the crank arms are in their second positions. The screws 220 are threaded into blocks 221, and by turning the screws 220 in the blocks 221, the second positions of the crank arms 211 through 214 can be adjusted individually. Between their first and second positions, the ends of the crank arms 211 through 214 are moved generally parallel to the axis of the head carrier 51.

The crank arms 211 through 214 are of equal lengths, and links 225 through 228 are pivotally connected to points near the ends of the crank arms 211 through 214 respectively. The radial distances along each crank arm from their axes to the points where the links are connected are equal. The link 225 extends generally perpendicularly away from the crank arm 211, and the other end of the link 225 is connected pivotally to the end of a link 231 disposed generally parallel to the crank arm 211 and generally perpendicular to the axis of the head carrier 51.

The link 226 extends perpendicularly away from the crank arm 212, and the other end of the link 226 is connected pivotally to the other end of the link 231. As a result, one end of the link 231 will move back and forth between two positions correspondingly to the movement of the crank arm 211 between its first and second positions, and the other end of the link 231 will move back and forth between two positions corresponding to the movement of the crank arm 212 between its first and second positions.

The movement of the ends of the link 231 generally will be parallel to the axis of the head carrier 51. The link 227 extends generally perpendicularly away from the crank arm 213, and the other end of the link 227 is connected pivotally to one end of a link 233 disposed generally parallel to the crank arm 213 and generally perpendicular to the axis of the head carrier 51. The other end of the link 233 is connected to the other end of the link 228, which extends generally perpendicularly away from the crank arm 214.

Thus, one end of the link 233 will be moved back and forth between two positions corresponding to the movement of the crank arm 213 between its first and second positions, and the other end of the link 233 will move back and forth between two positions corresponding to the movement of the crank arm 214 between its first and second positions. The movement of the ends of the link 233 will be generally parallel to the axis of the head carrier 51.

A link 235 extending generally parallel to the links 231 and 233 has a projection 237 at one end connected pivotally to the link 231 at a point 238 between the points where the links 225 and 226 are connected to the link 231. On the other end, the link 235 has a projection 239 connected pivotally to the link 233 at a point 240 between the points where the links 227 and 228 are connected to the link 233.

The pivot point 238 on the link 231 is two-thirds of the way from the point at which the link 225 is connected to the point where the link 226 is connected. The pivot point 240 on the link 233 is two-thirds of the way from the point at which the link 227 is connected to the point where the link 228 is connected. The pivot points 238 and 240 lie along a line generally perpendicular to the axis of the head carrier 51, and the distance between the link 225 and the pivot point 238 and also between the link 227 and the pivot point 240 is two-thirds times the length of the respective links 231 and 233, which are of equal length.

The cylindrical head carrier extends through the mounting plate 172 and the supporting wall 33 and is mounted slidably for axial movement in the wall 33 and plate 172. The end of the cylindrical head carrier is connected pivotally to the link 235 at a point four-fifths of the way from the end of the link 235 connected to the link 231 to the end of the link 235 connected to the link 233. With this arrangement the head carrier can be moved axially to any one of sixteen incremental positions.

Movement of the crank arm 211 between its first and second positions will cause a change in the axial position of the head carrier of one incremental position. Movement of the crank arm 212 between its first and second positions will cause a change in the axial position of the head carrier of two incremental positions. Movement of the crank arm 213 between its first and second positions will cause a change in the axial position of the head carrier of four incremental positions, and movement of the crank arm 214 between its first and second positions will cause a change in the axial position of the head carrier of eight incremental positions.

Thus, by properly positioning the crank arms 211 through 214, any one of the sixteen incremental axial positions of the head carrier may be selected.

Figure 28:
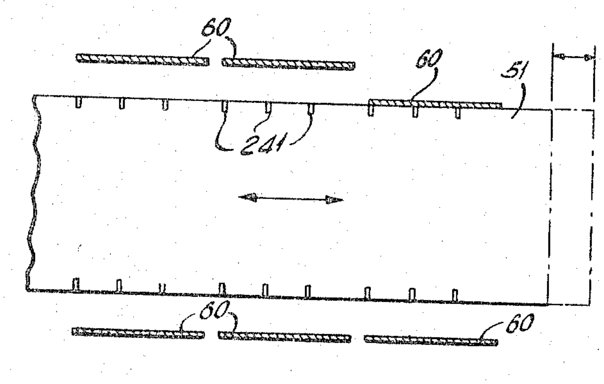
FIG. 28 is an enlarged view of the transducing head carrier illustrating the arrangement of the transducing heads on the transducing head carrier.

The head carrier has three transducing heads for each magnetic tape, and since there are sixteen tapes in a cartridge, the head carrier has forty-eight transducing heads contained therein. When the turn-around of a cartridge have been pulled into engagement with the magnets, the three transducing heads for each tape will be directly opposite the tape, as is illustrated in FIG. 28. The transducer heads are designated by the reference number 241.

During a transducing operation, as explained above, the tape on which the transducing operation is to be carried out will be positioned adjacent the head carrier as exemplified by the upper right-hand tape 60 in FIG. 28. While the tapes upon which no transducing operation is to be carried out can be stationary in a position spaced away from the head carrier as exemplified by the remaining tapes shown in FIG. 28, it is preferred that all tapes be spinning even if no transducing operation is being carried out on them at that time.

Figure 27:
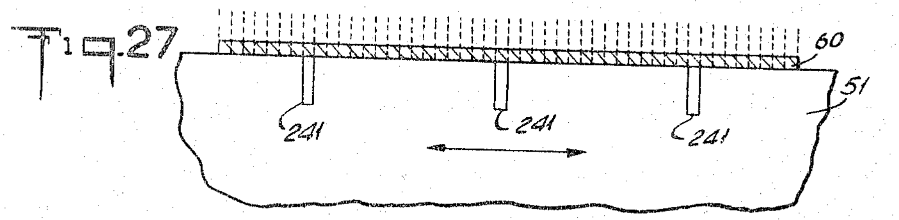
FIG. 27 is a greatly enlarged view of one tape in transducing relationship with some transducing heads of the random access memory.

As illustrated in FIG. 27, there are forty-eight recording tracks arranged side by side across the tape 60. By moving the head carrier to its different axial positions, the recording head 214 opposite the left side of the tape can be moved to record or reproduce from any one of the sixteen tracks on the left side of the tape, the middle transducing head 241 can be moved to record or reproduce from any one of the middle sixteen tracks on the tape, and the transducing head 241 opposite the right side of the tape can be moved to record or reproduce from any one of the sixteen tracks on the right side of the tape.

The selection of the particular one transducing head out of the three transducing heads which are opposite the selected tape, is made electronically. Thus, in this system, a particular tape is selected by means of the rotary solenoid 203 mounted on top of the transducing units to bring the selected tape into transducing position and cause it to be driven by the capstan. Then, the selection of one of the forty-eight tracks on the tape is made by mechanically positioning the head carrier by means of the whippletree mechanism and electronically selecting one of the three transducing heads opposite the selected tape.

Figure 10:
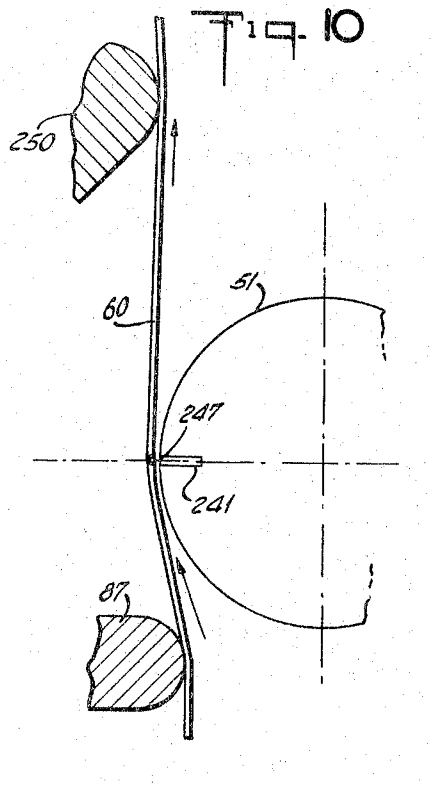
FIG. 10 is an enlarged view illustrating the position of a tape loop with respect to a transducing head and its carrier when the tape is moving at high speed during the transducing operation.

In the information storage apparatus, the tape that is selected for a transducing operation is driven at a high speed by the capstan. Due to the speed of the tape an air bearing is generated between the tape and the head carrier, in accordance with the invention as illustrated in FIG. 10. The tape curves, or wraps around, the head carrier for a short angle separated from the head carrier only by the air bearing. This angle is referred to as the "wrap angle," and the center of this angle is referred to as the "center of wrap."

When the tape is driven at a high speed, an aerodynamic effect causes the center of wrap to shift in the direction of movement of the tape. This phenomenon is illustrated by FIGS. 9 and 10.

Figure 9:
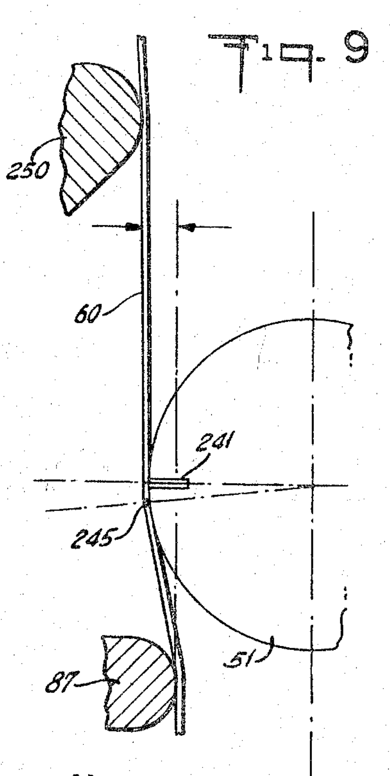
FIG. 9 is an enlarged view illustrating the position that a tape loop would assume with respect to the transducing head and its carrier if it were brought into transducing position but were not moving.

In FIG. 9, the tape is shown as it would be if it were positioned adjacent the head carrier as it is during a transducing operation but were not moving. In other words, FIG. 9 shows the position that the tape would be in if the valve mechanism 185 in the transducing unit for the tape were turned to pull the tape into the pocket 195 and release it from the pocket 191, but the capstan were not turning.

In operation, the capstan is always turning, so the condition depicted in FIG. 9 actually never occurs. As shown in FIG. 9, the center of wrap is at the point 245.

With the tape being driven at normal velocity, as shown in FIG. 10, the center of wrap is shifted to the point 247. The center of wrap is determined by the position of the tape guide 87, over which the tape travels below the head carrier, and a contoured projection 250 of the drive block over which the tape is guided above the carrier. In the apparatus of the present invention, the contoured projection 250 and the tape guide 87 are positioned relative to the head carrier so that the center of wrap that would occur under the conditions illustrated in FIG. 9 is shifted away from the center line of the transducing head 241 in a direction opposite to the direction of tape travel, so that when the tape is being driven at high speeds as it will be in a transducing operation.

The aerodynamic shift in the center of wrap brings the center of wrap in coincidence with the center line of the transducing head 241 as is illustrated in FIG. 10. Thus, the system of the present invention compensates for the aerodynamic shift in the center of wrap and prevents it from adversely affecting the recording operation.

As best shown in FIGS. 3 and 4, guides 87 have flanges 248 on each side between which the tapes are positioned. The flanges 248 accurately position the tapes horizontally along the head carrier 51. The spreaders 89 must maintain the tapes clear of these flanges 248 when a cartridge is being mounted on or removed from the supporting wall 33 to prevent the tapes from being damaged.

The tape is maintained out of contact with any of the contoured projections, such as projection 250, by pressurized air flowing from a plurality of ports 251, 253 and 255 each of which receives air from respective passageways 252, 254 and 256. These ports and passageways are shown only in FIG. 3 to avoid confusingly cluttering the other views. The passageways 252, 254 and 256 receive pressurized air from a chamber (not shown) in the wall 33 which, in turn, is connected to the same source that feeds air to the turn-arounds 61.

Figure 11:
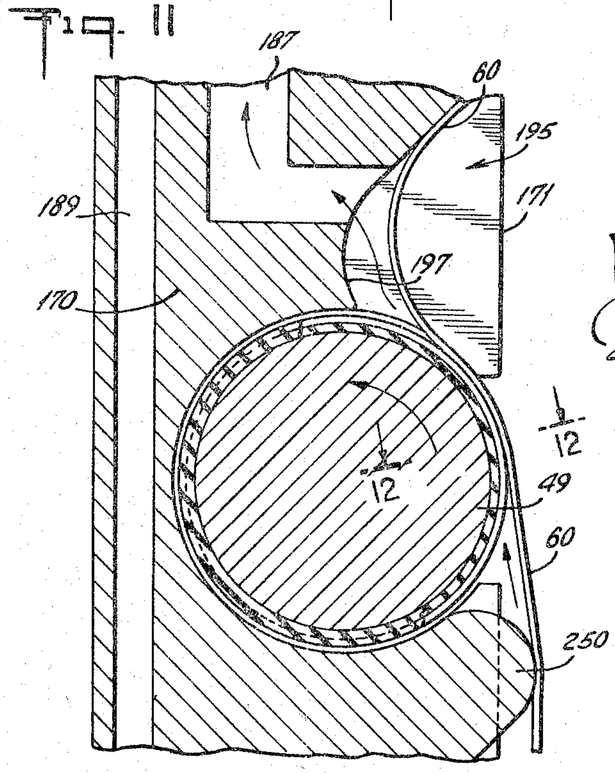
FIG. 11 is an enlarged sectional view illustrating the capstan driving a tape loop.
Figure 12:
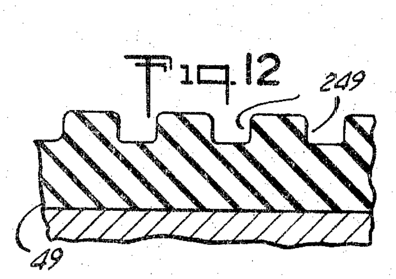
FIG. 12 is a sectional view taken along lines 28—28 of FIG. 11 illustrating details of the capstan.

As illustrated in FIGS. 11 and 12, the capstan which drives the tape is provided with grooves 249 which run circumferentially around the capstan. These grooves function to eliminate the air bearing that would normally exist between the capstan and the tape and, thus, permit the capstan to obtain a good frictional engagement with the tape to drive it. Because the driving surface of the capstan defines the entrance wall of the pocket 195, the air drawn in through the pocket 195 is drawn in part from the grooves 249. This reduces the pressure between the tape and the capstan and draws the tape more tightly into engagement with the capstan, thus providing a better frictional engagement between the capstan and the tape.

The above description is of a preferred embodiment of the invention, and many modifications may be made thereto without departing from the spirit and scope of the invention, which is defined in the appended claims.

What is claimed is:

1. A random access information storage memory device comprising:
supporting means,
magnetic means mounted on said supporting means defining a first magnetic pole and a second magnetic pole,
a first turn-around having a face defined by material attracted by said first magnetic pole,
said face of said first turn-around having a shape adapted to engage the face of said first magnetic pole so that said first magnetic pole will hold said first turn-around precisely in a first predetermined position,
a second turn-around having a face defined by a material adapted to be attracted by said second magnetic pole,
said face of said second turn-around having a shape adapted to engage said second magnetic pole so that said second magnetic pole will hold said second turn-around precisely in a second predetermined position,
a plurality of storage tape loops supported by said first and second turn-arounds and suspended between said first and second turn-arounds, and
transducing means mounted on said supporting means positioned to perform transducing operations on said tape loops when said turn-arounds supporting said tape loops are held by said magnetic poles in said first and second predetermined positions.

2. A memory device as recited in claim 1 wherein said faces of said first and second turn-arounds have shapes to fit with the shapes of the faces of said first and second magnetic poles.

3. A memory device as recited in claim 2 wherein said faces of said magnetic poles are flat and are positioned in the same plane and said faces of said turn-arounds are flat to fit with the faces of said magnetic poles.

4. A random access information storage memory device comprising:
supporting means,
magnet means mounted on said supporting means defining a first magnetic pole and a second magnetic pole,
a first tape supporting member having a face defined by material attracted by said first magnetic pole,
said face of said first tape supporting member having a shape adapted to engage the face of said first magnetic pole so that said first magnetic pole will hold said first tape supporting member precisely in a first predetermined position,
a second tape supporting member having a face defined by material attracted by said second magnetic pole,
said face of said second tape supporting member having a shape adapted to engage the face of said second magnetic pole so that said second magnetic pole will hold said second tape supporting member precisely in a second predetermined position,
a plurality of storage tapes supported by said first and second tape supporting members and suspended between said first and second tape supporting members, and
transducing means mounted on said supporting means positioned to perform transducing operations on said storage tapes when said tape supporting members supporting said storage tapes are held by said magnetic poles in said first and second predetermined positions.

5. A random access information storage memory device comprising:
supporting means,
magnet means mounted on said supporting means defining a first magnetic pole and a second magnetic pole,
a cartridge,
a first turn-around mounted in said cartridge to have limited movement with respect to said cartridge,
said first turn-around having a face defined by material attracted by said first magnetic pole, said face of said first turn-around having a shape adapted to engage the face of said first magnetic pole so that said first magnetic pole can hold said first turn-around precisely in a first predetermined position,
a second turn-around mounted in said cartridge to have limited movement with respect to said cartridge,
said second turn-around having a face defined by material attracted by said second magnetic pole, said face of said second turn-around having a shape adapted to engage the face of said second magnetic pole so that said second magnetic pole can hold said second turn-around precisely in a second predetermined position,
a plurality of storage tape loops supported by said first and second turn-arounds and suspended between said first and second turn-arounds,
means supporting said cartridge and operable to move said cartridge to an in position where said faces of said first and second turn-arounds will be near the faces of said first and second magnetic poles,
means operable when said cartridge is in said in position to lift said turn-arounds to a position where the faces of said turn-arounds align with the faces of said magnetic poles so that said magnetic poles will pull said faces of said turn-arounds into engagement precisely positioning said turn-arounds in said first and second positions, and
transducing means mounted on said supporting means positioned to perform transducing operations on said tape loops when said turn-arounds supporting said tape loops are held by said magnetic poles in said first and second predetermined positions.

6. A random access information storage memory device comprising:
supporting means,
magnet means mounted on said supporting means defining a first magnetic pole and a second magnetic pole,
a first turn-around having a face defined by material attracted by said first magnetic pole,
said face of said first magnetic pole having a shape adapted to engage the face of said first magnetic pole so that said first magnetic pole will hold said first turn-around precisely in a first predetermined position,
a second turn-around having a face defined by a material attracted by said second magnetic pole,
said face of said turn-around having a shape adapted to engage said second magnetic pole so that said second magnetic pole will hold said second turn-around precisely in a second predetermined position,
a plurality of storage tape loops supported by said first and second turn-arounds and suspended between said first and second turn-arounds,
means for supporting said first and second turn-arounds and for moving said first and second turn-arounds to a position where the faces of said first and second turn-arounds are near the faces of said first and second magnetic poles in alignment with the faces of said first and second magnetic poles,
so that said first and second magnetic poles will pull the faces of said first and second turn-arounds into engagement precisely positioning said first and second turn-arounds in said first and second predetermined positions, and
transducing means mounted on said supporting means positioned to perform transducing operations on said tape loops when said turn-arounds supporting said tape loops are held by said magnetic poles in said first and second predetermined positions.

7. A random information storage memory device comprising:
supporting means,
means on said supporting means to establish precisely defined first and second surfaces,
a cartridge mountable on said supporting means,
a first turn-around having a face shaped to engage said first surface,
a second turn-around having a face shaped to engage said second surface, said first and second turn-arounds being carried by said cartridge to have limited movement with respect to said cartridge,
means to hold said faces in engagement with said surfaces to establish a predetermined position for said first turn-around and another predetermined position for said second turn-around, at least one storage tape loop supported by said first and second turn-arounds and suspended therebetween, and
transducing means mounted on said supporting means and positioned to perform transducing operations on said tape loop when said turn-arounds supporting said tape loop are held in said predetermined positions, respectively.

8. An information storage apparatus comprising:
supporting means,
means on said supporting means to establish precisely defined first and second surfaces,
a cartridge,
a plurality of information storage tape loops in said cartridge,
first and second tape loop carrying elements mounted in said cartridge to have limited movement with respect to said cartridge, said elements adapted to extend within said tape loops and each of said elements having a face to engage said first and second surfaces, respectively,
means to hold said faces in engagement with said surfaces to establish a predetermined position for said first element and another predetermined position for said second element when said cartridge is mounted on said supporting means, and
transducing means mounted on said supporting means and positioned to perform transducing operations on said tape loops when said elements supporting said tape loops are held in said first and second predetermined positions.

References Cited by the Examiner

UNITED STATES PATENTS

| | | | |
|---|---|---|---|
| 1,746,959 | 2/1930 | Neely. | |
| 2,821,576 | 1/1958 | Gaubert ---------- | 179—100.2 |
| 2,914,752 | 11/1959 | MacDonald. | |
| 3,001,025 | 9/1961 | Gaubert ---------- | 179—100.2 |

M. HENSON WOOD, Jr., *Primary Examiner.*

J. N. ERLICH, *Assistant Examiner.*